Patented June 10, 1941

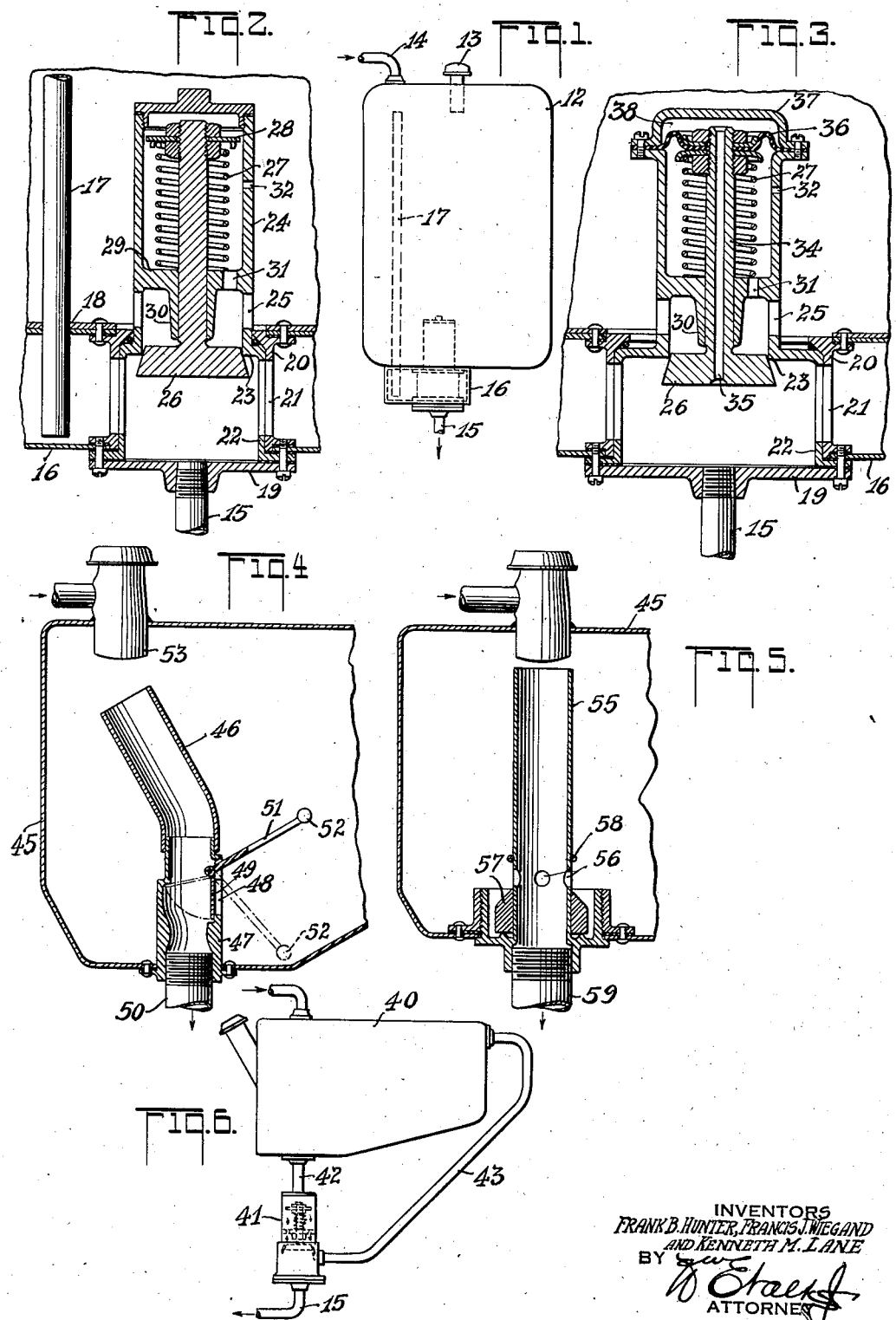

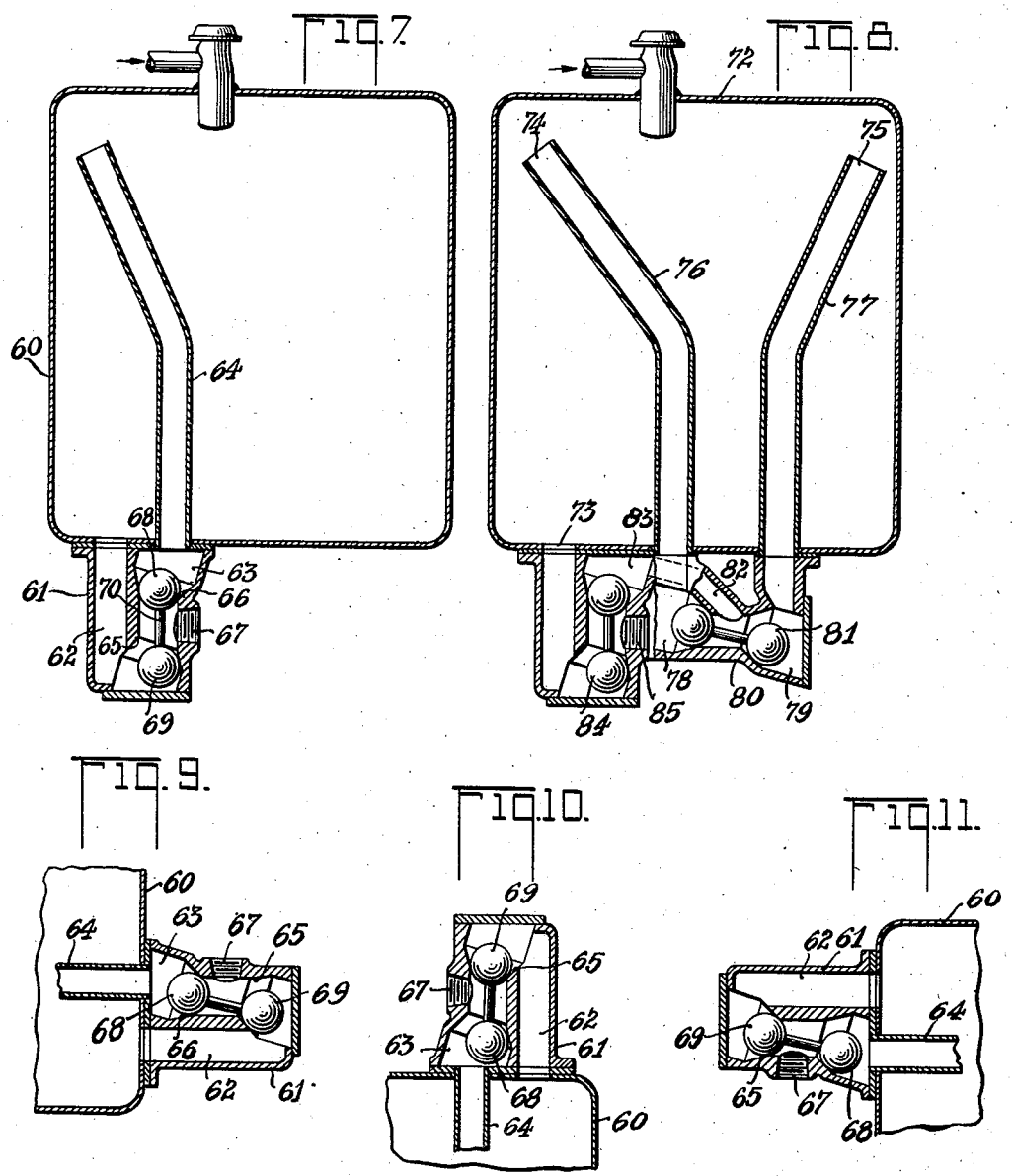

2,245,198

UNITED STATES PATENT OFFICE 2,245,198

OIL TANK

Frank B. Hunter, Wyckoff, Francis J. Wiegand, Midland Park, and Kenneth M. Lane, Ridgewood, N. J., assignors to Wright Aeronautical Corporation, a corporation of New York Application October 18, 1938, Serial No. 235,576

9 Claims. (Cl. 137—21)

This invention relates to improvements in tanks and is particularly applicable to fuel and oil tanks of aircraft which are normally used in aerobatic activities involving inverted flight and other maneuvers wherein the attitude of the aircraft may be far from a normal horizontal attitude. It will be appreciated that fuel and oil supply to the aircraft engine is dependent upon the outlets of the respective tanks being covered with fluid. Normally, the tank outlet is at the bottom and acceleration and gravity is depended on to keep the outlet covered with fluid. When an aircraft is in an inverted or tilted position, the tank outlet particularly if the tank is partly empty, will be uncovered interrupting the supply of fluid, with possible engine stoppage in the case of fuel as the fluid, or engine damage in the case of oil as the fluid.

Accordingly, it is an object of this invention to provide means to assure a continuous supply of fluid from a tank regardless of the position of the tank or of the aircraft in which it is installed. Still another object is to provide means by which alternate fluid outlets are provided in the tank, one near the normal top of the tank and one near the normal bottom thereof. Another object is to provide a plurality of tank outlets each adapted for use in a certain range of aircraft attitude to the elimination of the other outlets which might be uncovered by the liquid of the tank in such an attitude. A further object is to provide means responsive to the position of the tank and to the forces acting thereon for operating valves to select a tank outlet appropriate to a position in which the tank lies. Further objects comprise the provision of alternate embodiments of the invention, each appropriate to certain specific installations, and to provide relatively simple structure by which fluid flow from a tank may be assured in any attitude of an aircraft.

A better understanding of the several embodiments of the invention may be understood by reading the annexed detailed description in connection with the drawings, in which:

Fig. 1 is a side elevation of an oil tank embodying one arrangement of the invention;

Fig. 2 is an enlarged sectional detail of the valve mechanism of Fig. 1;

Fig. 3 is a section similar to Fig. 2 showing an alternative arrangement;

Figs. 4 and 5 respectively, are sections through a tank showing alternative arrangements of the invention;

Fig. 6 is a side elevation of a tank showing a valve arrangement applied externally thereof;

Fig. 7 is a section through a tank showing an alternative form of valve;

Fig. 8 is a section through a tank showing multiple tank outlets utilizing automatic selector valves, and Figs. 9, 10, and 11 are fragmentary sections of the valve arrangement of Fig. 7 in different positions of adjustment.

First referring to Figs. 1 and 2, we show a tank 12, which may contain oil, fuel or other liquid, having a filler opening covered by a cap 13, a return line 14, appropriate particularly to an oil tank, and an outlet passage 15 leading to the aircraft power plant or other apparatus to be provided with liquid. To the bottom of the tank 12 is secured a housing 16 from which a standpipe 17 projects upwardly into the tank terminating at its upper end fairly close to the inlet 14, the upper end of the standpipe being open at such a point in the tank as to be appropriate for use as a liquid outlet passage when the tank is inverted. As shown in Fig. 2, the outlet 15 communicates with the housing 16, being open thereto and being open to the bottom end of the standpipe 17, which latter is sealed in the floor of the tank proper as at 18. The outlet 15 connects to a cover plate 19 screwed to a cylindrical boss 20 having lateral openings 21, the cover 19 retaining a valve housing 22, having openings alined with the openings 21 and being provided with a valve seat 23 communicating with a valve body 24 opening as at 25 to the tank adjacent the floor thereof. Within the body 24 is a reciprocable valve 26 engageable with the seat 23, the valve being urged towards a closed position by means of a spring 27 inserted between a valve abutment 28 and a body abutment 29, the latter forming a valve guide as at 30. The stiffness of the spring 27 will be low enough to allow the valve 26 to open when the tank is in an upright position, so that fluid from the tank may pass through the opening 25 and pass the valve 26 to the outlet 15. Upon inversion of the tank, the weight of the valve together with the spring 27 will close the former preventing the withdrawal of air past the valve since in this attitude the fluid will have uncovered the housing 24. Thereupon, liquid in the tank will be drawn through the standpipe 17 into the housing 16 and out through the pipe 15, it being understood that suitable pump means is provided in the system to provide positive withdrawal of the tank liquid. It will be noted that the valve body 24 is vented as at 31 and 32 to permit free action of the valve stem in the body, the abutment being a fairly close fit within the valve body providing a form of dashpot to prevent fluttering of the valve.

In Fig. 3 the same general structure is shown, but the valve stem 34 is provided with an axial drilling 35 extending from the housing 16 to the upper end of the valve, which is sealed with respect to the tank body by means of a diaphragm 36 and a cap 37, the latter elements defining a space 38 in which the pressure is the same as the pressure in the housing 16 in virtue of the axial drilling 35. This serves as a balance for the valve tending to keep same closed when the tank is inverted since the pressure difference between the lower and upper surfaces of the valve head due to suction in the housing 16 would otherwise tend to lift the valve from its seat. The low pressure communicated to the space 38 will tend to balance the low pressure on the face of the valve permitting the weight of the valve and the action of the spring to close the valve when the tank is inverted with consequent elimination of bleed of air into the outlet 15.

In Fig. 6 an arrangement is shown in which a conventional tank 40 is provided with a valve unit 41 connected to the normal tank outlet by a pipe 42. An additional tank outlet 43 communicating with the tank at an elevated point enters the valve unit 41 and from the latter the normal outlet 15 extends. The valve unit 41 may be similar to that shown within in Fig. 2 or Fig. 3, the bottom part of the unit, below the valve shown in dotted lines, being equivalent to the housing 16 of said figures and into which the elevated tank outlet 43 discharges. The outlet line 43 is equivalent in function to the standpipe 17 of Fig. 2.

Fig. 4 shows a tank 45 having a standpipe 46 secured to a fitting 47 having a lateral opening 48 near the tank bottom. Within the fitting 47 is pivoted a flap valve 49 movable to close the opening 48 while permitting free passage from the standpipe 46 to the tank outlet 50, or to close off the standpipe and to permit free communication between the opening 48 and the tank outlet 50. Operation of the valve 49 is effected by a lever 51 attached thereto, having a weight 52 at its end. The lever is so disposed as to drop under the influence of gravity or acceleration forces and when the tank is upright it will drop to the dotted line position allowing liquid to pass through the opening 48 and to the tank outlet 50. When in the position mentioned the standpipe 46 will be closed at its bottom end and any liquid entering through the tank inlet 53 will fill the standpipe in readiness for tank inversion. Upon tank inversion, the lever 51 will move to the solid line position, closing the opening 48 and permitting free passage from the standpipe to the tank outlet. Since the standpipe is already charged with liquid no delay or interruption will be occasioned in liquid feed in the maneuver.

Fig. 5 shows a simple organization wherein a standpipe 55, reaching nearly to the top of the tank, is provided with openings 56 at its lower end. Embracing the bottom end of the standpipe is a slidable weight 57 comprising a valve, restrained from upward movement beyond the holes 56 by a stop 58. When the tank is upright, liquid will enter the tank outlet 59 through the holes 56, but when the tank is inverted the weight 57 will slide down over the holes 56, closing them, and enforcing liquid withdrawal through the standpipe 55 the end of which, in this position of the tank, will be submerged.

In Fig. 7 we show a tank 60 having a housing 61 secured to the tank bottom, the housing being provided with a passage 62 communicating with the tank bottom and with a passage 63 communicating with a standpipe 64 extending upwardly. Valve seats 65 and 66 are respectively formed in the passages 62 and 63, between which an opening 67 is formed with which an outlet duct is adapted to connect. A dumbbell valve comprising balls 68 and 69 connected by a stem 70 is located across the space between the valve seats 65 and 66 and may oscillate therebetween to close off the passage 63 while leaving the passage 62 open or vice-versa. In the tank position shown in Fig. 7 the ball 68 will rest upon the seat 66 closing off the standpipe 64 and establishing free communication from the tank bottom to the outlet opening 67. When the tank is wholly inverted as in Fig. 10, the ball 69 will engage the seat 65 closing off the passage 62, while leaving free communication between the standpipe 64 and the outlet opening 67. The angularity of the valve seats as shown, is so designed as to hold one or the other valve ball against its seat during the transition from upright to inverted tank position to assure continuous liquid withdrawal from that tank opening which will be covered by liquid. For instance, Fig. 9 shows the position of the valves as an airplane may be nosed down in steep glide or power dive during which acceleration force on the aircraft act in a downward direction with respect to the airplane itself with consequent coverage by the tank liquid of the passage 62. The valve remains in the position of Fig. 7 until inversion of the tank almost is accomplished whereupon the weight of the ball 68 will tumble the valve unit and effect engagement of the ball 69 with the seat 65. This position will maintain, as in Fig. 10, during completely inverted flight. While forces act upon the airplane in an upward direction with respect to the airplane itself wherein tank liquid will cover the open end of the standpipe 64, the valve unit will hold the position of Fig. 10, as shown in Fig. 11 which would illustrate the condition of the final half of an outside loop in which forces on the aircraft act upwardly with respect to the aircraft itself. In this situation liquid withdrawal should be through the standpipe and accordingly, the valve unit maintains the appropriate position in accordance with the forces imposed, wherein the ball 69 is seated on the seat 65 and the liquid is free to flow through the standpipe and from the tank outlet 67.

Numerous other maneuvers of an aircraft might be recited, but the above is typical to show the operation of the valve unit.

In Fig. 8 is shown a further adaptation of the dumbbell valve arrangement. In this showing a tank 72 is provided with three spaced tank outlets, at 73 in the normal tank bottom, at 74 in one upper corner of the tank and at 75 in another upper corner of the tank, the latter two outlets 74 and 75 respectively comprising the open ends of standpipes 76 and 77. The standpipes 76 and 77 respectively communicate with cavities 78 and 79 in a housing 80 provided therebetween with a dumbell valve 81, the stem of the latter lying in the zone of an outlet passage 82 communicating with a chamber 83. The bottom tank outlet 73 terminates in opposition to the cavity 83 and a dumbbell valve unit 84 operates between them, the stem of the valve unit 84 lying opposite a tank outlet 85. In the drawing the section on which the valve unit 81 and its exit port 82 lies, is of the section on which the valve 84 and its parts are taken, so that there is no communication between the cavity 78 and the outlet 85.

The above described arrangement allows for automatic selection of any one of the outlets 73, 74 or 75 according to the attitude of the tank and the external forces imposed thereon. If for instance, liquid lies along the righthand side of the tank and covers the opening 75, the valve 81 will seal the cavity 78 and fluid will flow through the standpipe 77, the passage 82, the passage 83, and through the outlet 85. In this situation, the slope of the valve seats in the passages 83 and 73 will cause the valve 84 to move toward such a position as to seal the passage 73 and to leave the passage 83 open to the outlet 85. If the tank be wholly inverted fluid will flow either through the opening 74 or 75 through the valve system to the outlet 85. If the tank be so disposed that the opening 74 alone is covered with liquid, the valve 81 will seal the cavity 79 and liquid will flow through the standpipe 76, the cavity 78, the passage 82, the cavity 83 and outwardly through the outlet 85. If the tank be so disposed that the outlet 73 alone is covered with liquid, as shown in the figure, the passage 73 will be open to the outlet 85 while the cavity 83 will be sealed by the valve 84. In this position it is immaterial what position the valve 81 may take but the latter will immediately respond to changes in force on or position of the airplane to establish communication only with that tank opening which will be submerged in liquid.

The several valve organizations above described are particularly appropriate to oil tank installations in present day aircraft for they comprise unitary structures which may be applied to tanks of any shape or form. Frequently, tanks may be high and narrow or, broad and flat, in which case the use of central tank outlets with a swingable standpipe adapted to drop to the tank bottom are inappropriate for there may not be sufficient clearance from the swinging joint to the tank side to permit of free standpipe swinging under all conditions. According to the present invention the standpipes may be formed to reach any desired part of the tank regardless of its shape, while the valve structures which govern the flow of fluid through the standpipe may be attached to the tank at any convenient point either within or without the tank proper.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In a tiltable tank having a plurality of spaced apart openings, a first valve unit connected to two of said openings and selectively operable by gravity to close one or the other opening, a second valve unit open to the first unit and to another tank opening, and an outlet conduit, said second valve unit being selectively operable by gravity to close said third tank opening or said first valve unit from the outlet conduit.

2. In a tiltable tank having a plurality of spaced apart openings, a first valve unit communicating with two of said openings, a second valve unit communicating with the first unit and with another said tank opening, said second valve unit including an outlet conduit, and valve elements in said units operable to connect one said opening at a time to said outlet.

3. In a liquid circulating system, a supply tank comprising in combination a normally elevated fluid inlet, a normally low fluid outlet, a standpipe adjacent said outlet terminating at its open upper end close to and beneath said fluid inlet so as to directly receive fluid entering the tank, and gravity operated valve means operable to connect said outlet with said standpipe or with the normal tank bottom according to the tilt position of said tank.

4. In a liquid circulating system, a supply tank having a normal upright position and including top and bottom walls, a fluid inlet entering the top wall, a valve housing in the bottom wall including an opening communicating with the tank near its bottom and a standpipe extending upwardly therefrom to a point close to and beneath said fluid inlet, whereby the standpipe is kept full by fluid passing through the inlet, an outlet conduit leading from said housing, and a gravity operated valve in the housing operable to connect said outlet either to said standpipe or to said housing opening according to the inverted or upright position, respectively, of said tank.

5. In a liquid circulating system, a supply tank having a fluid inlet at a normally elevated tank wall, a normally low fluid outlet, pipes communicating with spaced apart elevated portions of the tank, a valve housing to which said pipes and normally low outlet lead, a first valve unit therein comprising oppositely facing axially offset seats connected to respective pipes, a normally substantially horizontal dumbbell valve in said unit operable under gravity influence to close on one seat and leave the other seat, a second valve unit comprising oppositely facing axially offset seats connected one to the inter-seat zone of the first unit and the other to said normally low tank outlet, a normally substantially vertical dumbbell valve in said second unit operable under gravity influence to close one seat and leave the other seat, and a tank exit conduit connecting to the inter-seat zone of said second valve unit.

6. In a liquid circulating system, a supply tank having a fluid inlet at a normally elevated tank wall, a normally low fluid outlet, a pipe opening to an elevated part of the tank, a valve housing near the tank bottom comprising oppositely facing, axially offset seats whose axes are substantially vertical, the upper seat communicating with said pipe and the lower seat with said low fluid outlet, a normally substantially vertical dumbbell valve in said housing operable to close the uppermost seat and open the lowermost seat according to tank tilt, and a tank exit conduit connected to the inter-seat zone of said valve housing, said axially offset valve seats serving to effect closing dwell of said dumbbell valve upon the lowermost seat upon tank tilting.

7. In a liquid circulating system, a supply tank having a fluid inlet at a normally elevated tank wall, a normally low fluid outlet, a pipe opening to an elevated part of the tank, a valve housing near the tank bottom comprising oppositely facing seats whose axes are substantially vertical, the upper seat communicating with said pipe and the lower seat with said low fluid outlet, a normally substantially vertical dumbbell valve in said housing operable to close the uppermost seat and open the lowermost seat according to tank tilt, and a tank exit conduit connected to the interseat zone of said valve housing.

8. In a liquid circulating system, a tank comprising a normally elevated fluid inlet, a normally elevated fluid duct adapted to receive at least part of the fluid entering the tank through the inlet, a normally low fluid duct, a tank outlet, and gravity operated valve means operable to connect said outlet with one or the other of said ducts according to the tilt position of said tank.

9. In a liquid circulating system, a tank having a normally elevated fluid inlet; a fluid duct within said tank provided with two fluid inlet openings one being adjacent to the normal top of said tank and adjacent to said fluid inlet opening to receive directly at least part of the fluid entering said tank and the other being adjacent to the normal bottom of the tank, a tank outlet opening communicating with said duct near the normal bottom thereof, and a gravity operated valve means operable to cover and uncover said bottom fluid inlet opening according to the tilt position of said tank.

FRANK B. HUNTER.
FRANCIS J. WIEGAND.
KENNETH M. LANE.